US011810541B2

United States Patent
Mitsuhashi et al.

(10) Patent No.: US 11,810,541 B2
(45) Date of Patent: Nov. 7, 2023

(54) ELECTRONIC MUSICAL INSTRUMENT, POWER CONTROL DEVICE FOR ELECTRONIC MUSICAL INSTRUMENT, AND POWER CONTROL METHOD

(71) Applicant: Roland Corporation, Shizuoka (JP)

(72) Inventors: Takeshi Mitsuhashi, Shizuoka (JP); Hideaki Koyama, Shizuoka (JP)

(73) Assignee: Roland Corporation, Shizuoka (JP)

( * ) Notice: Subject to any disclaimer, the term of this patent is extended or adjusted under 35 U.S.C. 154(b) by 434 days.

(21) Appl. No.: 17/133,681

(22) Filed: Dec. 24, 2020

(65) Prior Publication Data
US 2021/0201878 A1 Jul. 1, 2021

(30) Foreign Application Priority Data

Dec. 27, 2019 (JP) ................................ 2019-239953

(51) Int. Cl.
*G10H 3/18* (2006.01)
*G10H 1/00* (2006.01)
(Continued)

(52) U.S. Cl.
CPC .......... *G10H 3/186* (2013.01); *G10H 1/0008* (2013.01); *G10H 1/18* (2013.01); *G10H 1/32* (2013.01);
(Continued)

(58) Field of Classification Search
CPC ........ G10H 3/186; G10H 1/0008; G10H 1/18; G10H 1/32; G10H 2220/165; G10H 2230/035
(Continued)

(56) References Cited

U.S. PATENT DOCUMENTS 7,355,110 B2 * 4/2008 Nash .................. G10H 1/32
84/646
9,985,518 B2 * 5/2018 Ishii ................... H02M 3/04
(Continued)

FOREIGN PATENT DOCUMENTS

CN 106340948 11/2018
CN 209401300 9/2019
(Continued)

OTHER PUBLICATIONS

"Search Report of Europe Counterpart Application", dated May 25, 2021, pp. 1-6.

*Primary Examiner* — Christina M Schreiber
(74) *Attorney, Agent, or Firm* — JCIPRNET (57) ABSTRACT

An electronic musical instrument is provided and includes: a musical tone processing circuit processing a musical tone signal; an output jack for connecting the musical tone signal to an amplifier; a phone jack for connecting the musical tone signal to a phone; a switch for turning power supply ON or OFF; and a control circuit that determines whether power supply is necessary and selects power supply from among first, second and third power based on information indicating each power receiving state of the first to third power (respectively from AC adapter, USB cable, and battery), information indicating whether an output plug is inserted into the output jack, a phone plug is inserted into the phone jack, the USB cable is connected to USB jack, and an ON or OFF operation of the switch is performed, and information indicating a power supply ON or OFF state of the electronic musical instrument.

20 Claims, 11 Drawing Sheets (51) Int. Cl.
*G10H 1/18* (2006.01)
*G10H 1/32* (2006.01)
*H02J 7/00* (2006.01)

(52) U.S. Cl.
CPC . *G10H 2220/165* (2013.01); *G10H 2230/035* (2013.01); *H02J 7/0047* (2013.01)

(58) Field of Classification Search
USPC .......................................................... 84/609
See application file for complete search history.

(56) References Cited

U.S. PATENT DOCUMENTS

| | | | |
|---|---|---|---|
| 10,693,306 B2* | 6/2020 | Ishii | H04R 3/00 |
| 10,985,602 B2* | 4/2021 | Chen | H02J 7/06 |
| 2005/0218880 A1* | 10/2005 | Ioffe | G10H 1/32 |
| | | | 323/371 |
| 2015/0271595 A1* | 9/2015 | Oh | H04R 3/00 |
| | | | 381/58 |
| 2021/0075251 A1* | 3/2021 | Maeda | H02J 7/00 |
| 2021/0201878 A1* | 7/2021 | Mitsuhashi | G06F 1/263 |
| 2021/0232202 A1* | 7/2021 | Sultenfuss | H02J 1/084 |

FOREIGN PATENT DOCUMENTS

| | | | | |
|---|---|---|---|---|
| CN | 113094314 A | * | 7/2021 | G06F 1/189 |
| JP | H09305170 | | 11/1997 | |
| JP | H09305170 A | * | 11/1997 | |
| JP | 2003316352 | | 11/2003 | |
| JP | 2016066419 A | * | 4/2016 | |
| JP | 2017032640 A | * | 2/2017 | |

\* cited by examiner

Specifications of power supply selection circuit (when 3 inputs are selected)

| Two control terminals and voltage state | | Output to output terminal OUT | |
|---|---|---|---|
| PRI | CP2 | OUT | CONNECTION (supply source) |
| 0 | 1 | IN1 | Adapter |
| 1 | 0 | IN2 | USB |
| 0 | 0 | IN3 | Battery |

Specifications of power supply selection circuit (when 2 inputs are selected)

| Two control terminals and voltage state | | Input output to output terminal OUT | |
|---|---|---|---|
| PRI | *CP2* | OUT | CONNECTION |
| 0 | *1* | IN1 | Adapter or Battery |
| 1 | *0* | IN2 | USB |
| *0* | *0* | *IN3* | |

※ Italic texts are unused

FIG. 11

ELECTRONIC MUSICAL INSTRUMENT, POWER CONTROL DEVICE FOR ELECTRONIC MUSICAL INSTRUMENT, AND POWER CONTROL METHOD

CROSS-REFERENCE TO RELATED APPLICATION

This application claims the priority benefit of Japan application no. JP 2019-239953, filed on Dec. 27, 2019. The entirety of the above-mentioned patent application is hereby incorporated by reference herein and made a part of this specification.

BACKGROUND

Technical Field

The disclosure relates to an electronic musical instrument and a power control device for an electronic musical instrument.

Description of Related Art

In the related art, there is a tuning device that turns on power by connecting a plug of a cable connected to a guitar (for example, Patent Document 1).

Patent Documents

[Patent Document 1] Japanese Patent Laid-Open No. 2003-316352

However, in the related art, the idea of an electronic musical instrument having a plurality of power supplies and using different power supplies depending on the situation has not been presented.

SUMMARY

The disclosure provides an electronic musical instrument that can suitably use a plurality of power supplies, and a power control device for the electronic musical instrument is provided. One example of the disclosure is an electronic musical instrument including: a performance operant; a musical tone processing circuit that processes a musical tone signal according to an operation of the performance operant; an output jack that is used to connect the musical tone signal to an amplifier; a phone jack that is used to connect the musical tone signal to a phone; a USB jack to which a USB cable is connected; a switch for turning power supply of the electronic musical instrument ON or OFF; and a control circuit configured to determine whether power supply is necessary and select power used for supply from among first, second and third power based on: information indicating each power receiving state of the first power supplied via an AC adapter, the second power supplied via the USB cable, and the third power supplied from a battery, information indicating whether an output plug is inserted into the output jack, a phone plug is inserted into the phone jack, the USB cable is connected to the USB jack, and an ON or OFF operation of the switch is performed, and information indicating a power supply ON or OFF state of the electronic musical instrument.

In a configuration of the electronic musical instrument, in a state in which power supply of the electronic musical instrument is turned OFF, when any of insertion of an output plug into the output jack, insertion of a phone plug into the phone jack, connection of a USB cable into the USB jack, and an ON operation of the switch is detected, the control circuit is configured to supply any of the first, second and third power to the musical tone processing circuit in order of priority.

In addition, in a configuration of the electronic musical instrument, the control circuit is configured to select power supplied to the musical tone processing circuit in order of the first power, the second power, and the third power.

In addition, in a configuration of the electronic musical instrument, in each of a state in which the first, second and third power is able to be supplied to the musical tone processing circuit, a state in which the first and third power is able to be supplied to the musical tone processing circuit, a state in which the first and second power is able to be supplied to the musical tone processing circuit, a state in which the third power is able to be supplied to the musical tone processing circuit, and a state in which the first power is able to be supplied to the musical tone processing circuit, the control circuit is configured to stop power supply to the musical tone processing circuit when an OFF operation of the switch is detected or removal of the output plug from the output jack and removal of a phone plug from the phone jack are detected.

In addition, in a configuration of the electronic musical instrument, in a state in which the second and third power is able to be supplied to the musical tone processing circuit, the control circuit is configured to stop power supply to the musical tone processing circuit, when an OFF operation of the switch is detected.

In addition, in a configuration of the electronic musical instrument, in a state in which the second power is able to be supplied to the musical tone processing circuit, the control circuit is configured to stop power supply to the musical tone processing circuit, when an OFF operation of the switch is detected or disconnection of the USB cable from the USB jack is detected.

One further example of the disclosure is a power control device for an electronic musical instrument. The electronic musical instrument includes: a musical tone processing circuit that processes a musical tone signal according to an operation of a performance operant, an output jack used to connect the musical tone signal to an amplifier, a phone jack used to connect the musical tone signal to a phone, a USB jack to which a USB cable is connected, and a switch for turning power supply of the electronic musical instrument ON or OFF. And, the power control device includes a control circuit, configured to determine whether power supply is necessary and select power used for supply from among first, second and third power based on: information indicating each power receiving state of the first power supplied via an AC adapter, the second power supplied via a USB cable, and the third power supplied from a battery, information indicating whether an output plug is inserted into the output jack, a phone plug is inserted into the phone jack, the USB cable is connected to the USB jack, and an ON or OFF operation of the switch is performed, and information indicating a power supply ON or OFF state of the electronic musical instrument.

One further example of the disclosure is a power control method for an electronic musical instrument. The electronic musical instrument includes: a musical tone processing circuit that processes a musical tone signal according to an operation of a performance operant, an output jack used to connect the musical tone signal to an amplifier, a phone jack used to connect the musical tone signal to a phone, a USB jack to which a USB cable is connected, and a switch for turning power supply of the electronic musical instrument ON or OFF. And, the power control method allows a power control device for the electronic musical instrument to determine whether power supply is necessary and select power used for supply from among first, second and third power based on: information indicating each power receiving state of the first power supplied via an AC adapter, the second power supplied via a USB cable, and the third power supplied from a battery, information indicating whether an output plug is inserted into the output jack, a phone plug is inserted into the phone jack, the USB cable is connected to the USB jack, and an ON or OFF operation of the switch is performed, and information indicating a power supply ON or OFF state of the electronic musical instrument.

One further example of the disclosure is a non-transitory computer readable medium that records a program which is executed by a computer of an electronic musical instrument. The electronic musical instrument includes: a musical tone processing circuit that processes a musical tone signal according to an operation of a performance operant, an output jack used to connect the musical tone signal to an amplifier, a phone jack used to connect the musical tone signal to a phone, a USB jack to which a USB cable is connected, and a switch for turning power supply of the electronic musical instrument ON or OFF. The program executes determination of whether power supply is necessary and selecting power used for supply from among first, second and third power based on: information indicating each power receiving state of the first power supplied via an AC adapter, the second power supplied via a USB cable, and the third power supplied from a battery, information indicating whether an output plug is inserted into the output jack, a phone plug is inserted into the phone jack, the USB cable is connected to the USB jack, and an ON or OFF operation of the switch is performed, and information indicating a power supply ON or OFF state of the electronic musical instrument.

DESCRIPTION OF THE EMBODIMENTS

Figure 1:
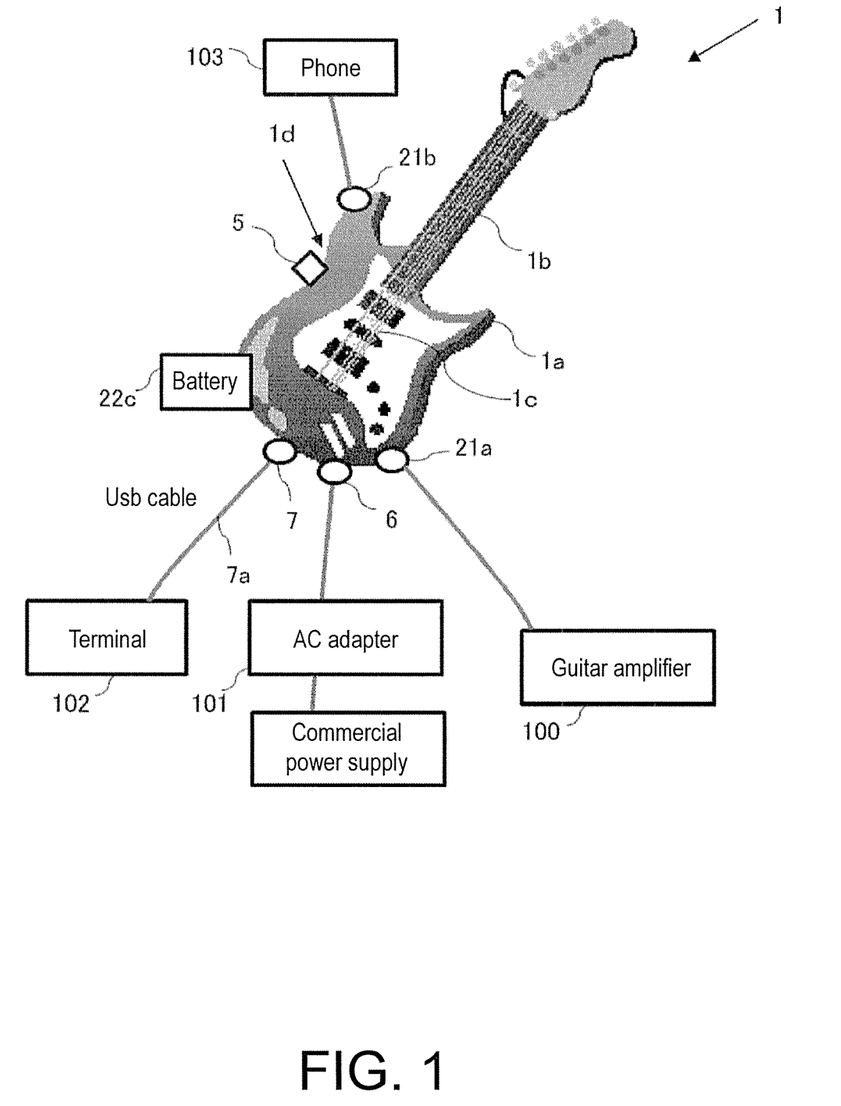
FIG. 1 shows an electronic guitar according to an embodiment.

Embodiments will be described below with reference to the drawings. The configurations of the embodiments are examples, and the disclosure is not limited to the configurations of the embodiments. FIG. 1 shows an electronic guitar according to an embodiment. An electronic guitar 1 is an example of an electronic musical instrument, and the electronic musical instrument may be an electronic musical instrument other than the electronic guitar. Like an electric guitar, the electronic guitar 1 includes a main body 1a, a neck 1b connected to the main body 1a, and strings (performance operants) 1c stretched from the main body 1a to the neck 1b. The electronic guitar 1 has a built-in circuit that processes a musical tone signal corresponding to vibration of the strings 1c according to a performance operation.

The electronic guitar 1 has an output jack 21a, and can be connected to a guitar amplifier 100. A musical tone signal is transmitted from the electronic guitar 1 to the guitar amplifier 100 and amplified by the guitar amplifier 100, and a musical tone based on the musical tone signal is emitted. In addition, the electronic guitar 1 has a phone jack 21b, and headphones or earphones can be connected to the phone jack 21b.

The electronic guitar 1 has a plurality of power supply paths through which operating power is supplied to the circuit. That is, the electronic guitar 1 has a connector 6 that connects an AC adapter 101 connected to a commercial power supply (AC power supply) and receives power (first power) from the commercial power supply. In addition, the electronic guitar 1 has a USB connector (USB jack) 7 to which a USB cable 7a is connected, and the USB connector 7 is connected to a terminal 102 via the USB cable 7a, and can communicate (transmit and receive data, etc.) with the terminal 102. The terminal 102 is a smartphone, a tablet terminal, a personal computer, or the like. In addition, the electronic guitar 1 can receive power (second power) via the USB cable 7a. In addition, the electronic guitar 1 can have a built-in battery 22c and can receive power (third power) from the battery 22c.

In addition, the electronic guitar 1 has a switch 5 that turns power supply of the electronic guitar 1 ON or OFF. In order to emphasize the switch 5, a state in which the switch 5 protrudes from the side surface of the electronic guitar 1 is shown in FIG. 1, but the switch 5 barely protrudes from a recess 1d on the side surface (the side facing upward during performance) of the electronic guitar 1 or is in a slightly dented state. Therefore, it is possible to prevent the switch 5 from being accidentally pressed.

Figure 2:
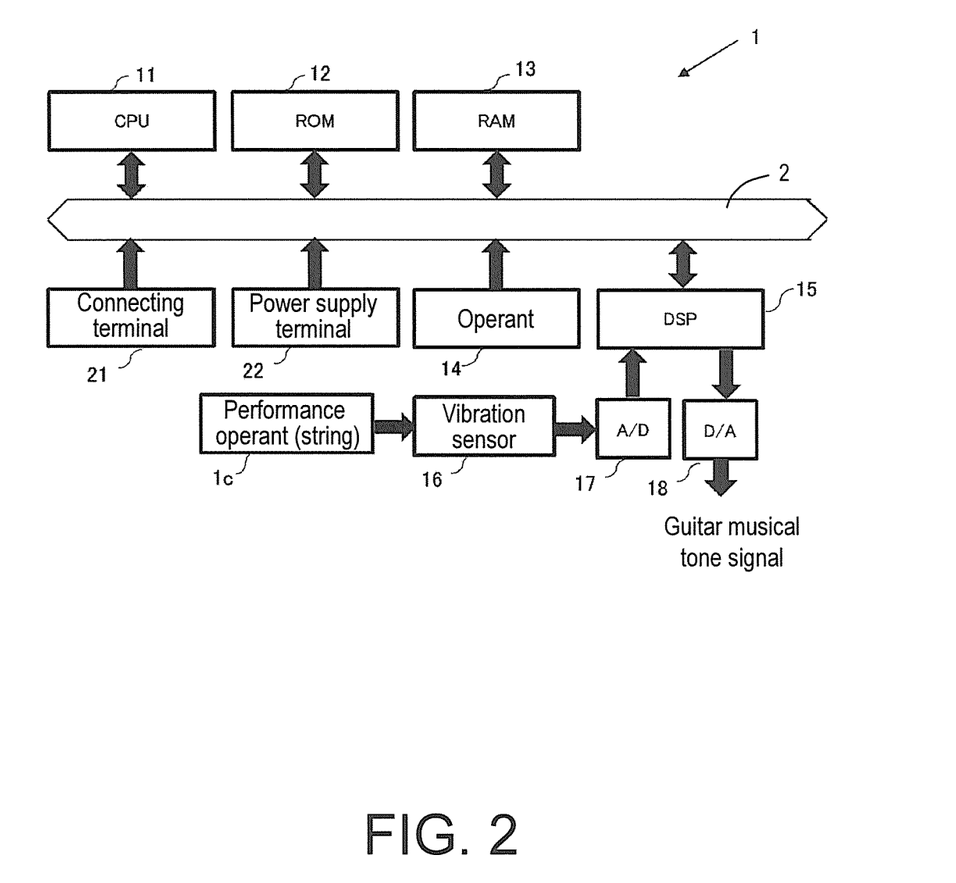
FIG. 2 shows a circuit configuration of the electronic guitar.

FIG. 2 is a diagram showing a circuit configuration example of the electronic guitar 1. In FIG. 2, the electronic guitar 1 has a central processing unit (CPU) 11 that controls overall operations. The CPU 11 is connected as a control circuit to a read only memory (ROM) 12, a random access memory (RAM) 13, an operant 14, a digital signal processor (DSP) 15, a connecting terminal 21, and a power supply terminal 22 via a bus 2.

The ROM 12 is used as a storage area for programs and data executed by the CPU 11. The RAM 13 is used as a work area for the CPU 11 and a storage area for programs and data. The RAM 13 and the ROM 12 are examples of a storage device (storage medium). The operant 14 is a knob, a key, button, a switch or the like for setting the electronic guitar 1, and the above switch 5 for power supply ON or OFF is also included in the operant 14.

The connecting terminal 21 includes the output jack 21a, the phone jack 21b, and the like described above. The power supply terminal 22 includes the connector 6 for the above AC adapter 101, a USB jack (USB connector) 7, a connecting terminal for the battery 22c, and the like.

The strings 1c are performance operants, and vibration of the strings 1c is converted into an electrical signal by a vibration sensor (pickup device) 16, and is converted into a digital signal by an A/D converter 17, and input to the DSP 15. The DSP 15 processes the digital signal (musical tone signal) according to the setting by the CPU 11 and outputs the processed signal. The output signal is output from a D/A converter 18 as a guitar musical tone signal. The guitar musical tone signal is connected to the guitar amplifier 100 and amplified, and a musical tone based on the guitar musical tone signal is then emitted from a speaker of the guitar amplifier 100.

Figure 3:
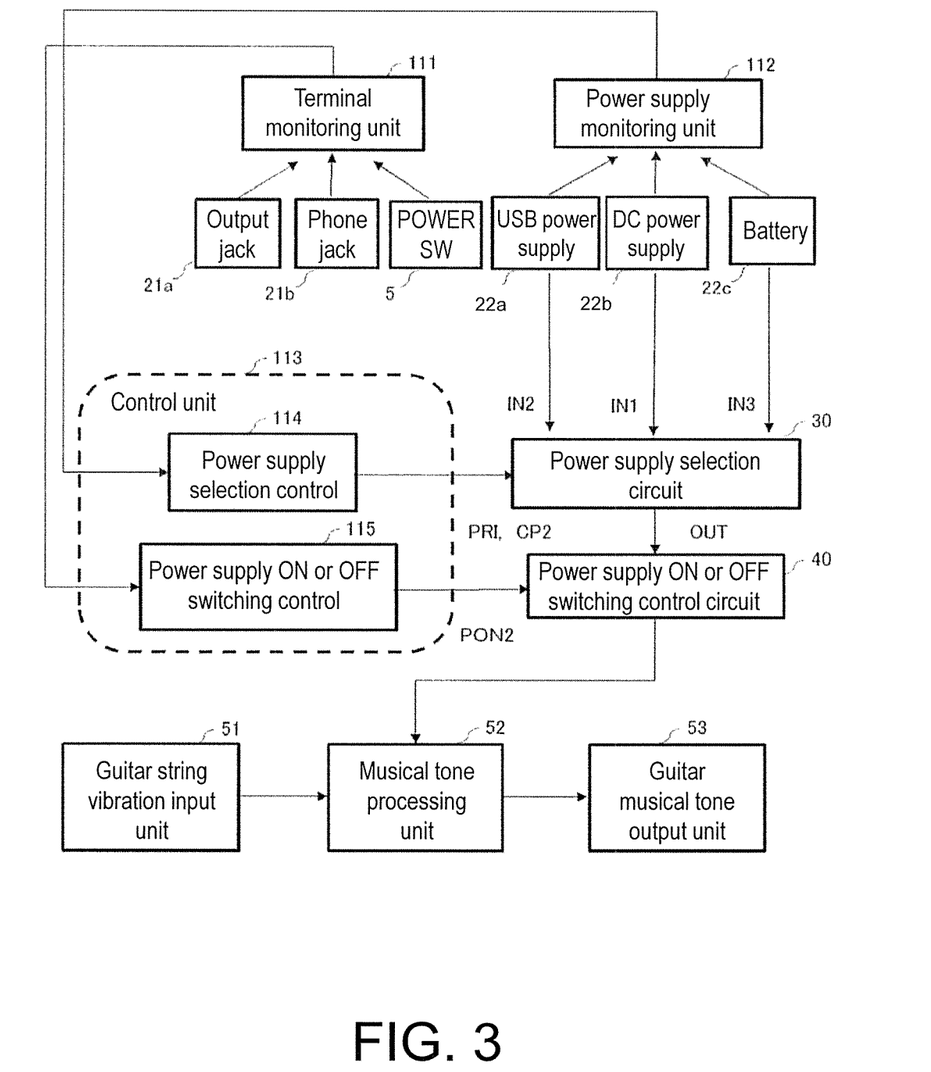
FIG. 3 is an explanatory diagram of power control (first example) in the electronic guitar.

FIG. 3 is a diagram explaining power supply control of the electronic guitar 1. When the CPU 11 executes a program, it operates as a terminal monitoring unit 111, a power supply monitoring unit 112, and a control unit 113. The terminal monitoring unit 111 monitors insertion and removal of an output plug into and from the output jack 21a (whether the guitar amplifier 100 is connected), insertion and removal of a phone plug into and from the phone jack 21b (whether a headphone or the like is connected), and ON or OFF of the switch 5 for power supply, and the like.

The power supply monitoring unit 112 monitors whether there is DC power supply 22b from the AC adapter 101, USB power supply 22a from the USB cable 7a, and power supply from the battery 22c. The monitoring can be performed, for example, by measuring a potential of a predetermined part of the connector 6 and the USB connector 7, or measuring a potential of a connecting terminal for the battery 22c.

The control unit 113 performs a power supply selection control 114 according to a state of power supply from the power supply monitoring unit 112 and a power supply ON or OFF switching control 115 according to results obtained by monitoring of the terminal monitoring unit 111. Here, the electronic guitar 1 includes a power supply selection circuit 30, and a signal IN1 indicating whether there is DC power supply, a signal IN2 indicating whether there is USB power supply 22a, and a signal IN3 indicating whether there is the battery 22c are input to the power supply selection circuit 30. The power supply selection control 114 supplies control signals (PRI and CP2) indicating the type of power supply to be selected to the power supply selection circuit 30 according to the results obtained by monitoring of the power supply monitoring unit 112. The power supply selection circuit 30 receives power and outputs a signal OUT indicating the type of power supply that matches the control signal. The signal OUT is input to a power supply ON or OFF switching circuit 40 of the electronic guitar 1.

In the power supply ON or OFF switching control 115, according to the results obtained by monitoring of the terminal monitoring unit 111, a control signal indicating turning power supply of the electronic guitar 1 ON or OFF is input to the power supply ON or OFF switching circuit 40. The power supply ON or OFF switching circuit 40 turns power supply of the electronic guitar 1 ON or OFF according to the signal OUT and the control signal. When the power supply of the electronic guitar 1 is turned ON, power is consumed by the operation of a musical tone processing unit 52.

A guitar string vibration input unit 51 is the strings 1c, the vibration sensor 16, and the A/D converter 17 shown in FIG. 2. The musical tone processing unit 52 is the DSP 15 shown in FIG. 2, and the DSP 15 is an example of the musical tone processing circuit. A guitar musical tone output unit 53 includes the above D/A converter 18 and output jack 21a.

Figure 4:
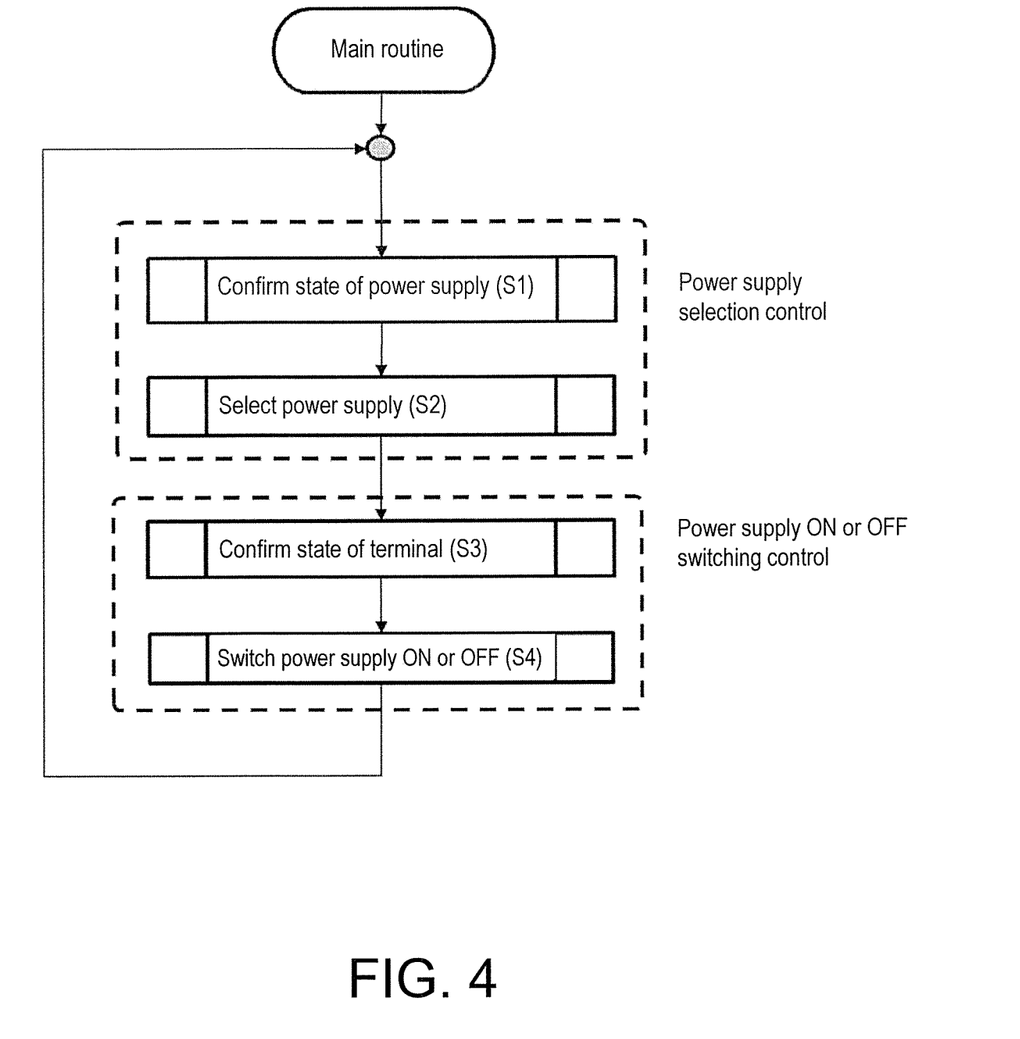
FIG. 4 is a flowchart showing a processing example of a main routine.

FIG. 4 shows a processing example of a main routine. In Step S1, the CPU 11 confirms the state of the power supply. In Step S2, the CPU 11 selects a power supply. In Step S3, the CPU 11 confirms the state of the terminal. In Step S4, the power supply is switched ON or OFF.

Figure 5:
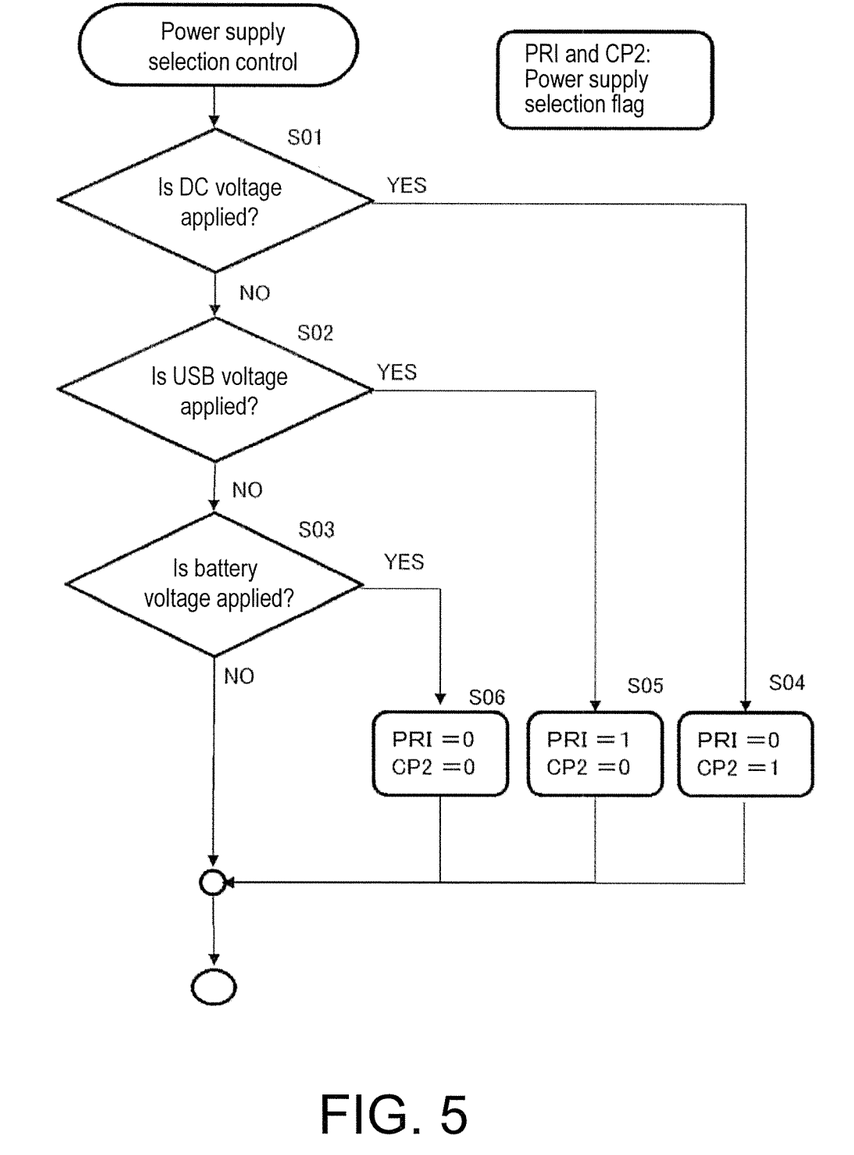
FIG. 5 is a flowchart showing an example of power supply selection control.

FIG. 5 is a flowchart showing an example of power supply selection control. In Step S01, it is determined whether a DC voltage is applied, that is, whether power is supplied from the DC power supply 22b. When it is determined that a DC voltage is applied, the process proceeds to Step S04, and otherwise, the process proceeds to Step S02.

In Step S02, it is determined whether a USB voltage is applied, that is, whether power is supplied from the USB power supply 22a. When it is determined that a USB voltage is applied, the process proceeds to Step S05, and otherwise, the process proceeds to Step S03.

In Step S03, it is determined whether a battery voltage is applied, that is, whether power is supplied from the battery 22c. When it is determined that a battery voltage is applied, the process proceeds to Step S06, and otherwise, the process ends.

In Step S04, the CPU 11 sets the value of the flag "PRI" to "0," sets the value of the flag "CP2" to "1," and ends the process. In Step S05, the CPU 11 sets the value of the flag "PRI" to "1," sets the value of the flag "CP2" to "0," and ends the process. In Step S06, the CPU 11 sets the value of the flag "PRI" to "0," sets the value of the flag "CP2" to "0," and ends the process. The values of the flags PRI and CP2 are supplied to the power supply selection circuit 30 and are used for power supply selection.

Figure 6:
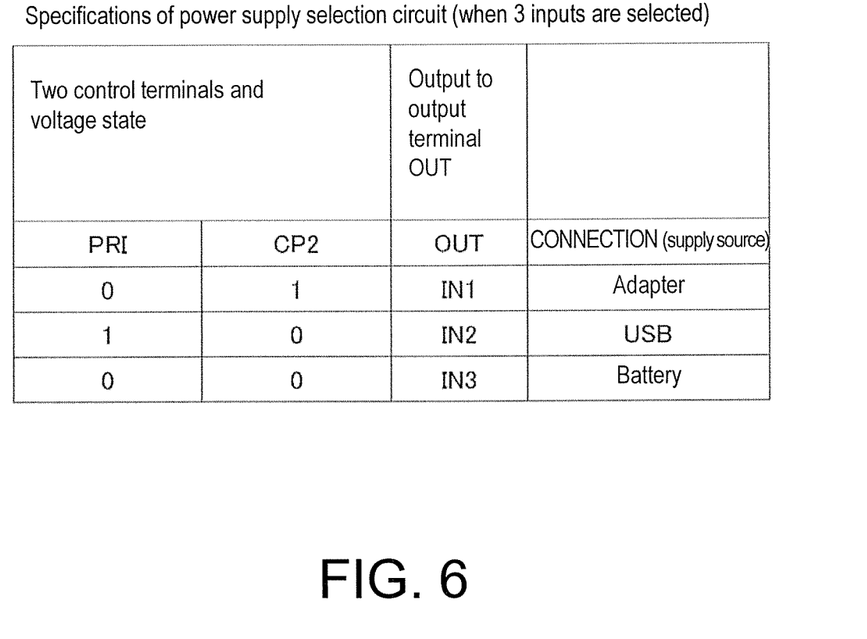
FIG. 6 is a table showing specifications of a power supply selection circuit.

FIG. 6 is a table showing specifications of a power supply selection circuit, and shows the relationship between values of the flags PRI and CP2 and the signal OUT output from the output terminal of the power supply selection circuit 30. When the values of the flags PRI and CP2 are "0" and "1," IN1 indicating power supply from the DC power supply 22b is input to the power supply selection circuit 30. In this case, the output OUT of the power supply selection circuit 30 is IN1, DC power supply (the AC adapter 101) is selected as a power supply source, and connecting the DC power supply to the musical tone processing unit 52 is selected.

When the values of the flags PRI and CP2 are "1" and "0," IN2 indicating power supply from the USB power supply 22a is input to the power supply selection circuit 30. In this case, the output OUT of the power supply selection circuit 30 is IN2, the USB power supply 22a is selected as a power supply source, and connecting to the musical tone processing unit 52 is selected.

When the values of the flags PRI and CP2 are "0" and "0," IN3 indicating power supply from the battery 22c is input to the power supply selection circuit 30. In this case, the output OUT of the power supply selection circuit 30 is IN3, the battery 22c is selected as a power supply source, and connecting to the musical tone processing unit 52 is selected.

Figure 7:
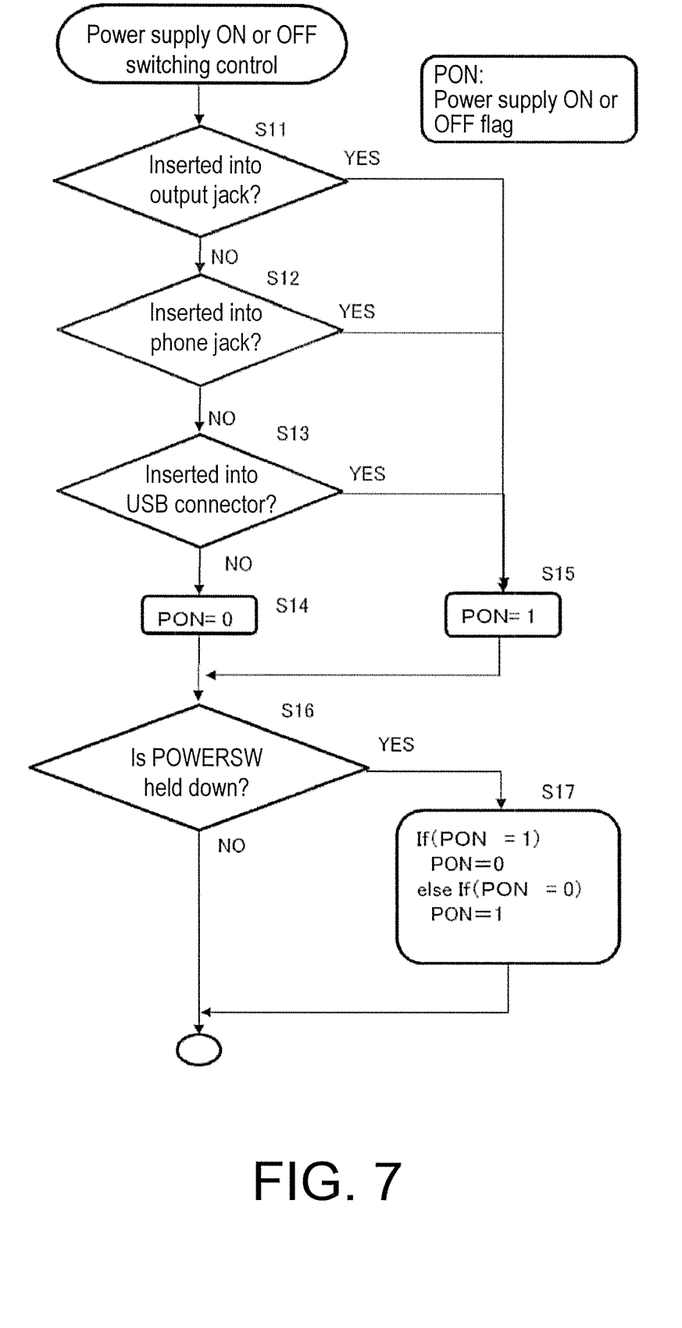
FIG. 7 is a flowchart showing an example of a power supply ON or OFF switching control.

FIG. 7 is a flowchart showing an example of a power supply ON or OFF switching control. In Step S11, the CPU 11 determines whether a plug of a cable connection to the guitar amplifier 100 is inserted into the output jack 21a. When it is determined that a plug is inserted, the process proceeds to Step S15, and otherwise, the process proceeds to Step S12.

In Step S12, the CPU 11 determines whether a plug such as a headphone is inserted into the phone jack 21b. When it is determined that a plug is inserted, the process proceeds to Step S15, and otherwise, the process proceeds to Step S13.

In Step S13, the CPU 11 determines whether a male connector for the USB cable 7a is inserted into the USB connector 7. When it is determined that a connector is inserted, the process proceeds to Step S15, and otherwise, the process proceeds to Step S14.

In Step S14, the CPU 11 sets the value of the power supply ON or OFF flag "PON" to "0." In Step S15, the CPU 11 sets the value of the power supply ON or OFF flag "PON" to "1." In Step S16, it is determined whether the switch 5 for power supply (POWER SW) is held down. When it is determined whether the switch 5 for power supply is held down, the process proceeds to Step S17, and otherwise, the process ends.

In Step S17, the CPU 11 sets the value of PON to "0" when the value of PON is "1" and sets the value of PON to "1" when the value of PON is "0." PON "1" indicates turning power supply on, and PON "0" indicates turning power supply OFF. Step S17 shows that, if the switch 5 for power supply is held down when power supply is turned OFF, the power supply of the electronic guitar 1 is turned ON, and if the switch 5 for power supply is held down when power supply is turned ON, the power supply of the electronic guitar 1 is turned OFF. When the power supply switch is held down, accidentally turning power supply ON or OFF is prevented.

The power supply ON or OFF switching circuit 40 connects a power supply designated by the value of OUT to the musical tone processing unit 52 when the value of PON is "1" and turns the power supply of the electronic guitar 1 OFF when the value of PON is "0," and stops power supply to the musical tone processing unit 52.

The terminal monitoring unit 111 may be realized by a logic circuit or a switching mechanism that outputs a voltage value corresponding to each state or may be realized by the same CPU as the CPU 11 that connects each state to a general purpose port and performs the power supply selection control 114. The power supply monitoring unit 112 transmits information according to a voltage state of each power supply to the power supply ON or OFF switching control 115. The power supply monitoring unit 112 may be realized by a logic circuit that outputs a voltage corresponding to each state or may be realized by the same CPU as the CPU that connects each state to a general purpose port and performs power supply ON or OFF switching control.

Figure 8:
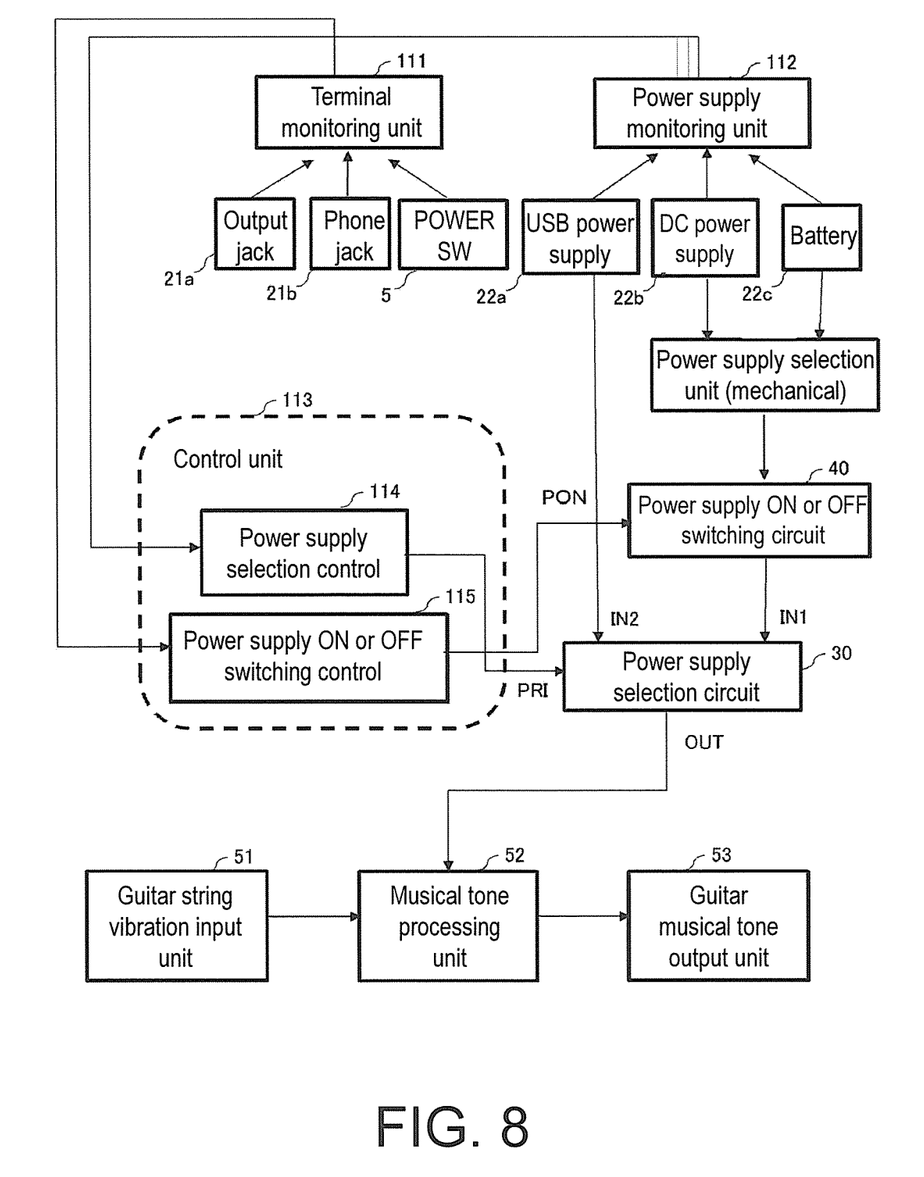
FIG. 8 is a diagram explaining a second example.

FIG. 8 to FIG. 11 show a second example different from the example (first example) shown in FIG. 3 to FIG. 7. As shown in FIG. 8, the second example differs from the first example (FIG. 3) in the following points. The USB power supply is not incorporated under the control of the power supply ON or OFF switching circuit 40. Therefore, when a power supply other than the USB power supply is not used, if the USB cable 7a is connected to the USB connector 7, this may be treated as turning the power supply on in the power supply selection circuit 30 without determination of the power supply ON or OFF switching control 115. In the power supply selection circuit 30, USB power supply is selected. Therefore, a user can turn the power supply of the electronic guitar 1 on by simply connecting the USB cable 7a to the electronic guitar 1, and the electronic guitar can be used immediately.

Figure 9:
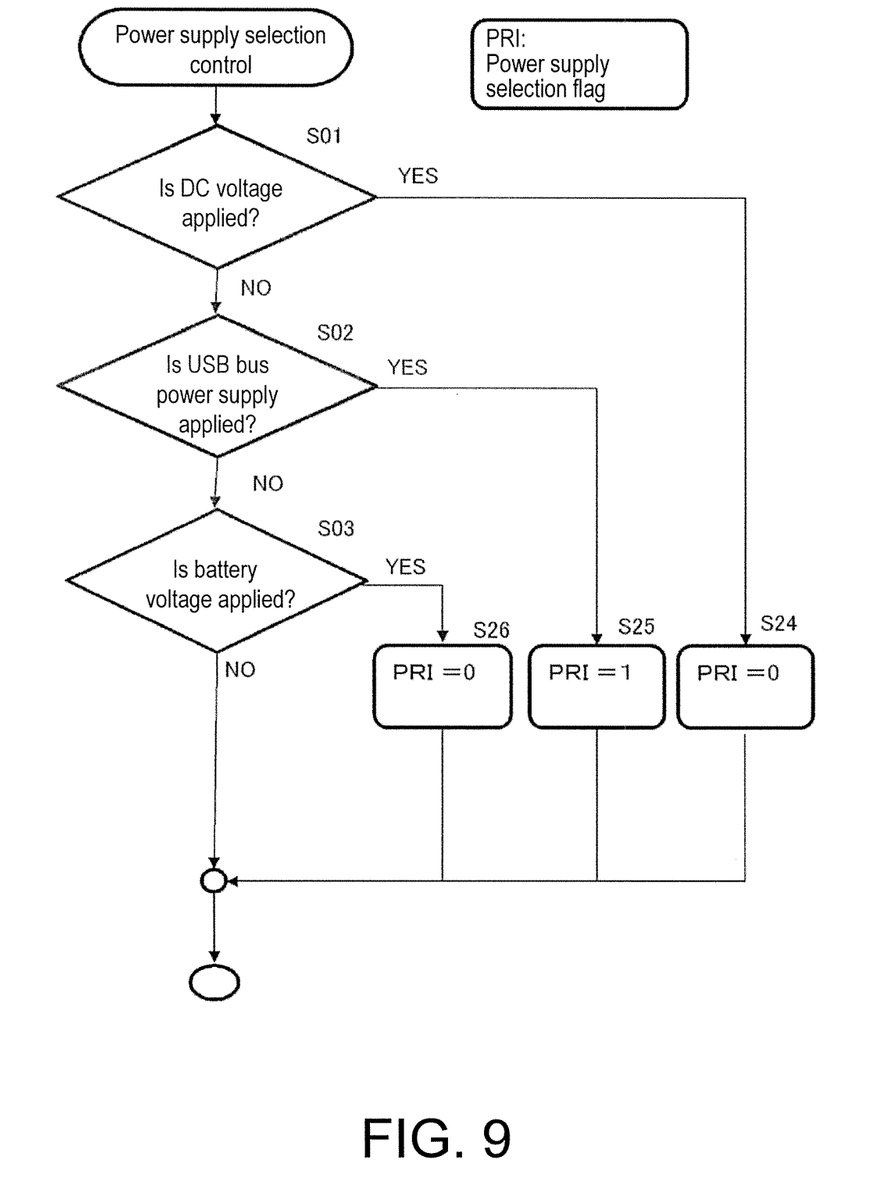
FIG. 9 is a flowchart showing a processing example in power supply selection control of the second example.

FIG. 9 is a flowchart showing an example of power supply selection control in the second example. The processes of Steps S01, S02 and S03 in FIG. 9 are the same as those in the first example. However, in Steps S24, S25 and S26 corresponding to Steps S04, S05 and S06, the following processes are performed. In Step S24, the value of the power supply selection flag PRI is set to 0. In Step S25, the value of the power supply selection flag PRI is set to 1. In Step S24, the value of the power supply selection flag PRI is set to 0.

Figure 10:
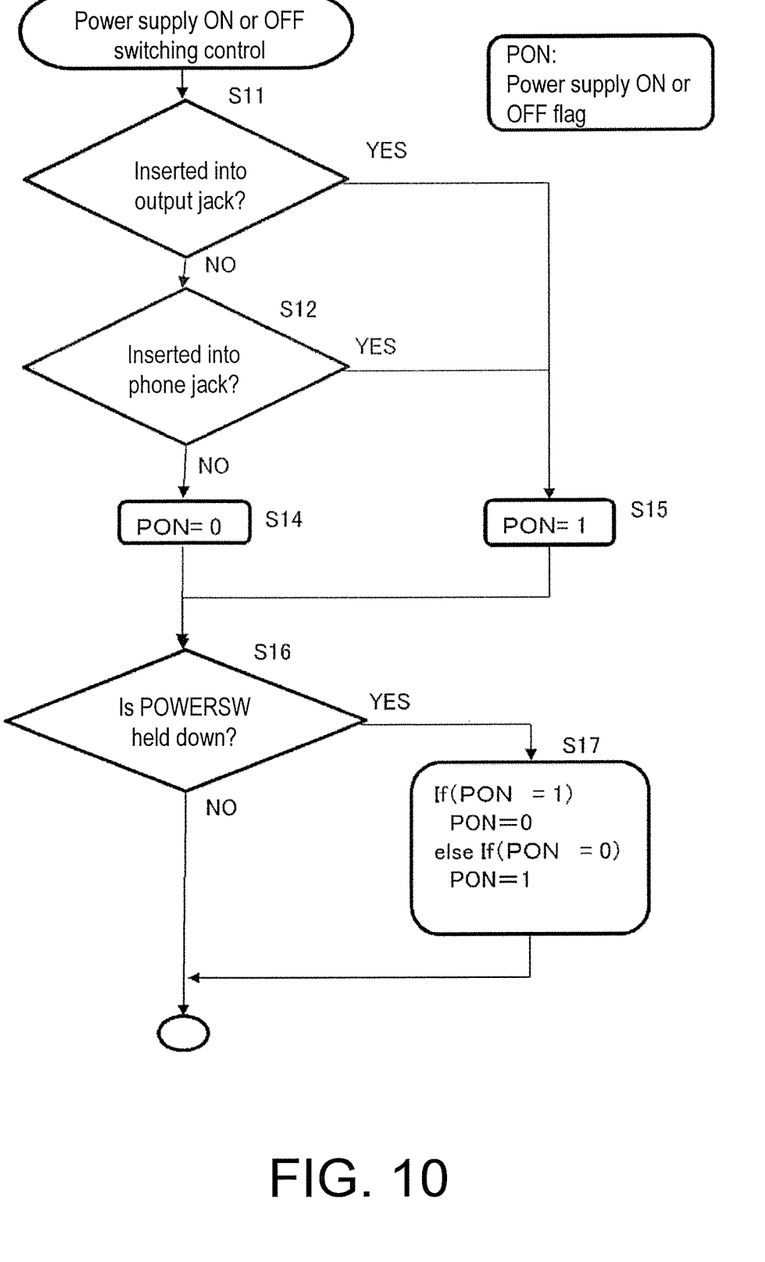
FIG. 10 is a flowchart showing a processing example in a power supply ON or OFF switching control of the second example.

FIG. 10 is a flowchart showing an example of power supply ON or OFF switching control in the second example. The second example is the same as the first example except that the process of Step S13 is removed from the processes of Steps S11 to S17. In the second example, a PON setting process (determination of whether connection is necessary) depending on whether insertion into the USB connector is performed is not performed.

Figure 11:
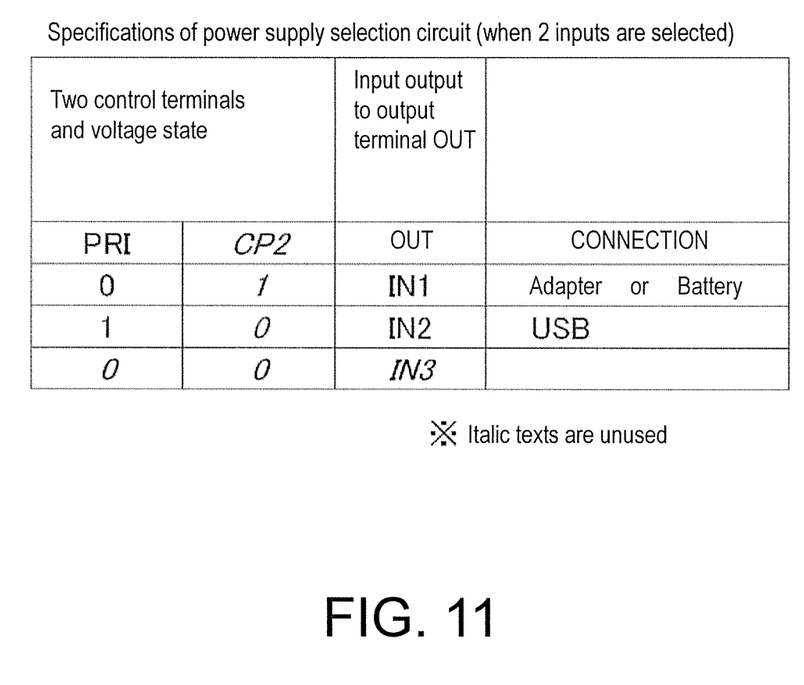
FIG. 11 is a table showing specifications of a power supply selection circuit in the second example.

FIG. 11 is a table showing specifications of the power supply selection circuit 30 in the second example, and when PRI "0" is output as a result of the power supply selection control 114, IN1 indicating the DC power supply 22b or the battery 22c as a power supply is input from the power supply ON or OFF switching circuit 40 to the power supply selection circuit 30, and IN1 is output as the output OUT. Therefore, the DC power supply 22b or the battery 22c is connected to the musical tone processing unit 52. When PRI "1" is output, IN2 indicating the USB power supply 22a is input to the power supply selection circuit 30 and IN2 is output as the output OUT. Therefore, the USB power supply 22a is connected to the musical tone processing unit 52. The order of priority in selecting power supply is the same as that of the first example (DC>USB>battery).

The electronic guitar 1 according to the embodiment includes a DSP (the musical tone processing unit 52: musical tone processing circuit) that processes a musical tone signal according to an operation of the strings 1c (performance operant), the output jack 21a used to connect the musical tone signal to the guitar amplifier 100, the phone jack 21b used to connect the musical tone signal to a phone 103, the USB connector 7 to which the USB cable 7a is connected, and the switch 5 for turning power supply of the electronic guitar 1 ON or OFF. Based on information indicating each power receiving state of first power supplied via the AC adapter 101, second power supplied via the USB cable 7a, and third power supplied from a battery 23c, information indicating whether an output plug is inserted into the output jack 21a, a phone plug is inserted into the phone jack 21b, the USB cable 7a is connected to the USB connector 7 (USB jack), and an ON or OFF operation of the switch 5 is performed, and information indicating a power supply ON or OFF state of the electronic guitar 1, the CPU 11, which is a control device of the electronic guitar 1, can determine whether power supply is necessary and select power used for supply from among first, second and third power.

According to the electronic guitar 1, it is possible to switch power supply sources according to the situation such as home practice, recording, and live performance. In addition, a plurality of power supply operation methods can be selected, and the power supply of the electronic guitar 1 can be turned ON by connecting to an output jack, connecting to a headphone jack, connecting to a USB jack, or turning the power supply switch on. Power supply can be turned OFF using the switch 5 for power supply installed on the side surface of the electronic guitar 1 without disconnecting various cables. In particular, in products that use conventional USB bus power, it is necessary to disconnect the USB cable when power supply is turned OFF, but such labor is not necessary.

In the electronic guitar 1, the following situations are assumed.

<Situation 1>
(1) The electronic guitar 1 is used using USB power supply.

(2) After use, the switch 5 is held down to turn the power supply OFF.

(3) When the electronic guitar 1 is used again, the switch 5 is held down to turn the power supply on.

In this manner, only the power supply of the electronic guitar 1 can be turned OFF while the terminal 102 is turned ON and the USB cable 7a is still connected.

<Situation 2>

(1) and (2) are the same as above.

(3) Then, the USB cable 7a is pulled out and the electronic guitar 1 is put in the guitar case.

(4) When the electronic guitar 1 is used again, if the USB cable 7a is connected, the electronic guitar 1 can be turned ON again without holding down the switch 5.

As described above, in the conventional mechanical power supply switch, it is necessary to turn the power supply switch OFF when the guitar is put away, but it is not necessary with the electronic guitar 1. The configurations shown in the embodiments can be appropriately combined as long as they do not deviate from the object.

It will be apparent to those skilled in the art that various modifications and variations can be made to the disclosed embodiments without departing from the scope or spirit of the disclosure. In view of the foregoing, the disclosure is intended to cover modifications and variations provided that they fall within the scope of the following claims and their equivalents.

What is claimed is:

1. An electronic musical instrument, comprising:
   a performance operant;
   a musical tone processing circuit that processes a musical tone signal according to an operation of the performance operant;
   an output jack configured to connect the musical tone signal to an amplifier;
   a phone jack configured to connect the musical tone signal to a phone;
   a USB jack to which a USB cable is connected;
   a switch for turning power supply of the electronic musical instrument ON or OFF; and
   a control circuit configured to determine whether power supply is necessary and select power supplied to the musical tone processing circuit from among first, second and third power based on:
   information indicating each power receiving state of the first power supplied via an AC adapter, the second power supplied via the USB cable, and the third power supplied from a battery,
   information indicating whether an output plug is inserted into the output jack, a phone plug is inserted into the phone jack, the USB cable is connected to the USB jack, and an ON or OFF operation of the switch is performed, and
   information indicating a power supply ON or OFF state of the electronic musical instrument.

2. The electronic musical instrument according to claim 1, wherein
   in a state in which power supply of the electronic musical instrument is turned OFF,
   when any of insertion of an output plug into the output jack, insertion of a phone plug into the phone jack, connection of the USB cable into the USB jack, and an ON operation of the switch is detected, the control circuit is configured to supply any of the first, second and third power to the musical tone processing circuit in order of priority.

3. The electronic musical instrument according to claim 2, wherein
   the control circuit is configured to select power supplied to the musical tone processing circuit in order of the first power, the second power, and the third power.

4. The electronic musical instrument according to claim 1, wherein
   the control circuit is configured to select power supplied to the musical tone processing circuit in order of the first power, the second power, and the third power.

5. The electronic musical instrument according to claim 1, wherein in each of a state in which the first, second and third power is supplied to the musical tone processing circuit, a state in which the first and third power is supplied to the musical tone processing circuit, a state in which the first and second power is supplied to the musical tone processing circuit, a state in which the third power is supplied to the musical tone processing circuit, and a state in which the first power is supplied to the musical tone processing circuit,
   the control circuit is configured to stop power supply to the musical tone processing circuit, when an OFF operation of the switch is detected or removal of the output plug from the output jack and removal of a phone plug from the phone jack are detected.

6. The electronic musical instrument according to claim 1, wherein in a state in which the second and third power is supplied to the musical tone processing circuit,
   the control circuit is configured to stop power supply to the musical tone processing circuit, when an OFF operation of the switch is detected.

7. The electronic musical instrument according to claim 1, wherein
   in a state in which the second power is supplied to the musical tone processing circuit,
   the control circuit is configured to stop power supply to the musical tone processing circuit, when an OFF operation of the switch is detected or disconnection of the USB cable from the USB jack is detected.

8. A power control device for an electronic musical instrument, wherein the electronic musical instrument includes: a musical tone processing circuit that processes a musical tone signal according to an operation of a performance operant, an output jack configured to connect the musical tone signal to an amplifier, a phone jack configured to connect the musical tone signal to a phone, a USB jack to which a USB cable is connected, and a switch for turning power supply of the electronic musical instrument ON or OFF, and the power control device comprising:
   a control circuit, configured to determine whether power supply is necessary and select power supplied to the musical tone processing circuit from among first, second and third power based on:
   information indicating each power receiving state of the first power supplied via an AC adapter, the second power supplied via the USB cable, and the third power supplied from a battery,
   information indicating whether an output plug is inserted into the output jack, a phone plug is inserted into the phone jack, the USB cable is connected to the USB jack, and an ON or OFF operation of the switch is performed, and
   information indicating a power supply ON or OFF state of the electronic musical instrument.

9. The power control device for an electronic musical instrument according to claim 8, wherein
   in a state in which power supply of the electronic musical instrument is turned OFF, when any of insertion of an output plug into the output jack, insertion of a phone plug into the phone jack, connection of the USB cable into the USB jack, and an ON operation of the switch is detected, the control circuit is configured to supply any of the first, second and third power to the musical tone processing circuit in order of priority.

10. The power control device for an electronic musical instrument according to claim 9, wherein
the control circuit is configured to select power supplied to the musical tone processing circuit in order of the first power, the second power, and the third power.

11. The power control device for an electronic musical instrument according to claim 8, wherein
the control circuit is configured to select power supplied to the musical tone processing circuit in order of the first power, the second power, and the third power.

12. The power control device for an electronic musical instrument according to claim 8, wherein
in each of a state in which the first, second and third power is supplied to the musical tone processing circuit, a state in which the first and third power is supplied to the musical tone processing circuit, a state in which the first and second power is supplied to the musical tone processing circuit, a state in which the third power is supplied to the musical tone processing circuit, and a state in which the first power is supplied to the musical tone processing circuit,
the control circuit is configured to stop power supply to the musical tone processing circuit, when an OFF operation of the switch is detected or removal of the output plug from the output jack and removal of a phone plug from the phone jack are detected.

13. The power control device for an electronic musical instrument according to claim 8, wherein
in a state in which the second and third power is supplied to the musical tone processing circuit,
the control circuit is configured to stop power supply to the musical tone processing circuit when an OFF operation of the switch is detected.

14. The power control device for an electronic musical instrument according to claim 8, wherein
in a state in which the second power is supplied to the musical tone processing circuit,
the control circuit is configured to stop power supply to the musical tone processing circuit when an OFF operation of the switch is detected or disconnection of the USB cable from the USB jack is detected.

15. A power control method for an electronic musical instrument, wherein the electronic musical instrument includes: a musical tone processing circuit that processes a musical tone signal according to an operation of a performance operant, an output jack used-to configured to connect the musical tone signal to an amplifier, a phone jack configured to connect the musical tone signal to a phone, a USB jack to which a USB cable is connected, and a switch for turning power supply of the electronic musical instrument ON or OFF, and the power control method comprising:
allowing a power control device for the electronic musical instrument to determine whether power supply is necessary and select power supplied to the musical tone processing circuit from among first, second and third power based on:
information indicating each power receiving state of the first power supplied via an AC adapter, the second power supplied via the USB cable, and the third power supplied from a battery,
information indicating whether an output plug is inserted into the output jack, a phone plug is inserted into the phone jack, the USB cable is connected to the USB jack, and an ON or OFF operation of the switch is performed, and
information indicating a power supply ON or OFF state of the electronic musical instrument.

16. The power control method for an electronic musical instrument according to claim 15, wherein
in a state in which power supply of the electronic musical instrument is turned OFF,
when any of insertion of an output plug into the output jack, insertion of a phone plug into the phone jack, connection of the USB cable into the USB jack, and an on operation of the switch is detected, the control circuit is configured to supply any of the first, second and third power to the musical tone processing circuit in order of priority.

17. The power control method for an electronic musical instrument according to claim 16, wherein
the control circuit is configured to select power supplied to the musical tone processing circuit in order of the first power, the second power, and the third power.

18. The power control method for an electronic musical instrument according to claim 15, wherein the control circuit is configured to select power supplied to the musical tone processing circuit in order of the first power, the second power, and the third power.

19. The power control method for an electronic musical instrument according to claim 15, wherein
in each of a state in which the first, second and third power is supplied to the musical tone processing circuit, a state in which the first and third power is supplied to the musical tone processing circuit, a state in which the first and second power is supplied to the musical tone processing circuit, a state in which the third power is supplied to the musical tone processing circuit, and a state in which the first power is supplied to the musical tone processing circuit,
the control circuit is configured to stop power supply to the musical tone processing circuit when an OFF operation of the switch is detected or removal of the output plug from the output jack and removal of a phone plug from the phone jack are detected.

20. The power control method for an electronic musical instrument according to claim 15, wherein
in a state in which the second and third power is supplied to the musical tone processing circuit,
the control circuit is configured to stop power supply to the musical tone processing circuit when an OFF operation of the switch is detected.

* * * * *